Dec. 17, 1935.   R. W. LUCE   2,024,650
METHOD OF MAKING PLUNGERS FOR GLASS MOLDS
Filed Feb. 21, 1933
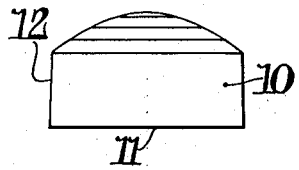
Fig.1.
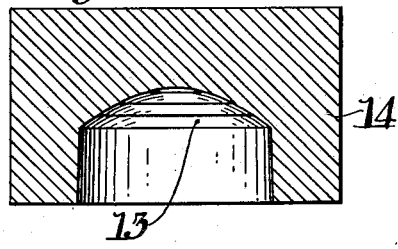
Fig.2.
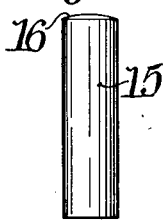
Fig.3.
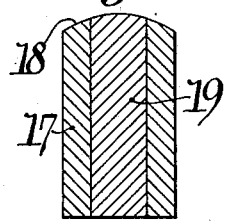
Fig.4.
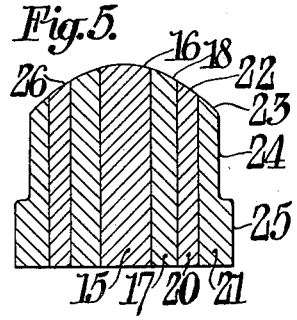
Fig.5.
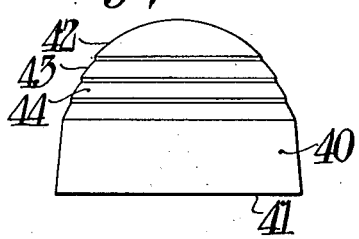
Fig.7.   Fig.6.
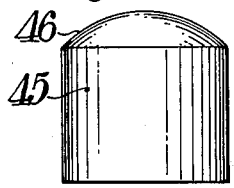
Fig.8.
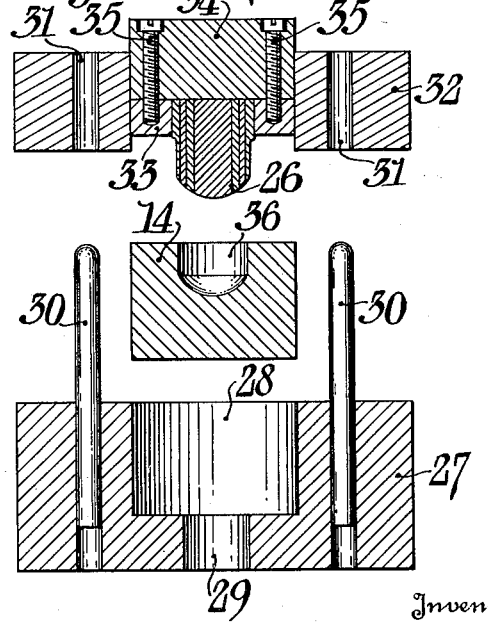
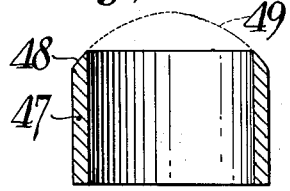
Fig.9.
Inventor:
Richard W. Luce,
By Newton M. Perrins
Rolla N. Carter
Attorneys.

Patented Dec. 17, 1935

2,024,650

UNITED STATES PATENT OFFICE 2,024,650

METHOD OF MAKING PLUNGERS FOR GLASS MOLDS

Richard W. Luce, Elizabeth, N. J., assignor to Eastman Kodak Company, Rochester, N. Y., a corporation of New York Application February 21, 1933, Serial No. 657,832

1 Claim. (Cl. 76—107)

This invention relates to the molding of glass lenses and particularly to an improved method of making hobs or plungers for molds to be used for the molding of small lenses such as those used in reflecting sign units. When the refracting surface of a lens is molded in its finished shape i. e., it is not thereafter polished, the surface of the mold must be given a very high polish. When it is desired to mold a lens having a spherical surface the high polish necessary to obtain a satisfactory optical surface may be given the mold by ordinary pitch polishing methods and this pitch polishing may be applied directly to the surface of the mold or to a hob which is to be used to sink the mold. Heretofore, a small lens having a refracting surface other than a single spherical surface could not be molded satisfactorily because of the difficulty, if not impossibility, of accurately polishing the mold or the hob used to form the mold since pitch polishing methods could not be used.

The object of this invention is to provide a method of making hobs with which surfaces of shapes other than a single sphere may be obtained which have a high polish whereby glass lenses having truly optical surfaces can be completely finished directly in the mold. In accordance with this object the hob used to form the mold is made and polished in sections whereby ordinary pitch polishing methods may be employed.

The novel features which I believe to be characteristic of my invention are set forth with particularity in the appended claim. My invention itself, however, will best be understood by reference to the following description taken in connection with the accompanying drawing in which Figure 1 is a diagram showing one type of lens which may be formed with a mold made in accordance with the method of my invention;

Figure 2 is a section of a mold from which the lens of Figure 1 may be formed;

Figure 3 is an elevation of a rod forming the central part of a hob;

Figure 4 is a section of a tube forming an annular part of the hob and is shown containing a core which may be used to facilitate accurate polishing;

Figure 5 is a sectional view of a complete hob assembled from parts including those illustrated in Figures 3 and 4;

Figure 6 is a sectional view illustrating a suitable arrangement which may be used in sinking the mold with the hob;

Figure 7 shows another lens surface which may be molded; and

Figures 8 and 9 show how a hob corresponding to the lens surface of Figure 7 may be made in accordance with this invention.

Referring to the drawing, Figure 1 shows a lens 10 consisting of a single piece of glass having a plane rear surface 11 and a frusto conical side 12. The front of the lens 10 consists of a series of co-axial contiguous spherical zones 5 the curvatures of which are so computed that the average focus for the central part of each zone lies at a common point, all of which is fully described and claimed in co-pending application Serial Number 639,575 filed October 26, 1932, by Charles W. Frederick and assigned to the same assignee as is the present invention.

In forming such a lens with a mold such as is shown in Figure 2 it is obvious that the inner face 13 of the mold formed in a cylindrical block 14 of nickel or nickel alloy must have a high polish if the lens 10 is to have a true optical surface, since the different curvatures of the front of the lens 10 cannot later be polished by ordinary pitch polishing methods. A hob used to form the mold 14 having a series of surfaces of different curvatures if comprised of a single block of metal, is equally impossible to polish with any degree of accuracy and accordingly some method must be found either for accurately polishing the molding surface 13 or for polishing a hob used to sink the mold. My invention furnishes a practical and a simple method whereby pitch polishing may be successfully utilized in providing a molding surface having a high polish.

My invention is equally applicable to polishing the mold directly or polishing the hob used to sink the mold and will be described in detail as applied to the polishing of the hob.

As shown in Figure 3 a central rod 15 of steel or other suitable metal has a convex end 16 which is polished by regular optical polishing methods on a pitch polisher to the radius of curvature desired for the central zone of the lens 10 to be molded, the diameter of the rod 15 being the diameter of the central zone. The part of the hob corresponding to the next outer zone of the lens is now made from a tube 17, a cross section of which is shown in Figure 4, having an internal diameter equal to the diameter of the rod 15 and having an external diameter equal to the external diameter of the 2nd zone of the lens 10. One end of the tube 17 is then subjected to a grinding and polishing operation to form a spherical zone 18 corresponding to the curvature desired for this zone in the finished lens. This is also done by a regular pitch polishing method and the surface 18 is given a true optical polish. Inasmuch as in the forming of a mold for making relatively small lenses such, for example, as those now generally used in highway reflecting signs the wall of the tube 17 is not very thick and it is generally desirable, but not necessary, to insert a core 19 which may be of any suitable metal, or wood, in the tube 17 for the polishing operation. The core 19 provides a more substantial surface for polishing and renders the centering of the polishing apparatus much easier than when it is attempted to polish the surface 18 without the core 19 being present. The same operation is then repeated for the number of zones desired and the several tubes are then assembled with the rod 15 to form a hob 26 as shown in section in Figure 5 where there is shown the central rod 15 and a series of tubes 17, 20 and 21 having spherical surfaces 16, 18, 22, and 23 each of which has been finished by regular optical methods and accordingly each has the degree of polish obtained by such methods.

If it is desired, as is quite usual, the outermost tube 21 may be provided with a sloping outer surface 24 to facilitate removal of a lens from the mold and with a thickened base 25 to make it more sturdy. It will be understood that the length of the rod 15 and the tubes 17, 20, and 21 are made such that their spherical surfaces will form a series of contiguous zones unless it is desired to provide offsets between the zones in which case their individual lengths will be made accordingly and the resulting lens will be of the type shown in Fig. 7.

With the hob 26 constructed as described some means is necessary to insure that in sinking the mold a proper alinement will be maintained between the mold blank and the hob, and one suitable arrangement is illustrated in Figure 6 as comprising a heavy base plate 27 provided with a cylindrical recess 28 for receiving and holding the blank mold block 14. The base plate 27 may be provided with an opening 29 through which a suitable tool may be inserted to remove the block 14 from the recess 28. The plate 27 is also provided with at least two guide pins 30 which are adapted to cooperate with cylindrical openings 31 in an annular ring 32 to position accurately the ring 32 with respect to the plate 27 carrying the mold blank 14.

The hob 26 is given rigidity by mounting it by means of a pressed fit in an annular ring 33 to which is secured a backing plate 34 by any suitable means, as screws 35. The annular ring 33 carrying the hob 26 is mounted by means of a pressed fit in the annular ring 32 provided with the positioning means 31. These pressed fittings are satisfactory since the pressure needed to sink the mold is applied, as indicated by the arrow, against the backing plate 34.

When it is desired to sink the mold the blank 14, which preferably has been provided with a concavity 36 approximating the shape of the mold to be formed, is positioned in the recess 28 and the ring 32 is lowered over the guide pins 30 until the hob 26 rests against the bottom of the concavity 36 in the blank 14. Pressure sufficient to cause the mold to take the shape of the surface of the hob 26 is now applied to the plate 34. I have found that with the blank 14 made of nickel a pressure of 20 to 25 tons is sufficient to make the mold, although other pressures may be used and the pressure which will give the best results for different metals may be determined by experiments.

My invention will now be described as applied to the making of a mold for forming lenses having zones other than spherical. One such lens is shown in Figure 7 as comprising a lens 40 having a plane polished rear surface 41 and a convex front surface consisting of a central spherical zone 42 and two annular toric zones 43 and 44. The lens 40 as shown is provided with offsets between the several zones but they may be contiguous as were the zones of the lens 10 shown in Figure 1.

As in the case previously described, a central rod 45 is provided with a polished spherical surface 46 corresponding to the central spherical zone of the lens to be molded. A tube 47 of the proper diameter is then selected and subjected to a grinding and polishing operation so as to form upon it a toric zone 48 corresponding to the desired zone 43 of the finished lens. This can be done by a well known pitch polishing method and the surface is given a true optical polish. Broken line 49 indicates the outline of a core if one is used in the polishing operation. The same operation is repeated for the number of zones desired and the several tubes are assembled with the rod 45 to form a hob which is then used to sink a mold as above described in detail. A lens having such steps or offsets and having zones some of which are not spherical is disclosed in my copending application Serial No. 657,831 filed February 21, 1933.

In practicing the method of this invention it has been found that when a hob having a high polish is used to sink the mold the active surface of the mold has a polish comparable to the polish on the hob and lenses molded therein have surfaces which are truly optical.

In making a mold such as is shown in Figure 2 having a series of spherical zones it is possible to polish the surfaces directly if sufficient care is exercised. The successive surfaces are first approximated and then each surface is subjected to an individual polishing operation by means of a tool having a curvature such that it contacts only the zone surface having the same curvature. This individual polishing is possible because the central zone has the smallest radius of curvature and each successive zone from the center 45 has an increasingly larger radius.

Although I have described my invention as applied to the making of two special forms of molds it is obviously useful in making molds for a great number of other lens forms in which similar problems arise. Various modifications will readily suggest themselves to persons skilled in the art without departing from the scope of my invention as set forth in the appended claim.

What I claim as new and desire to secure by Letters Patent of the United States is:

The method of making plungers for glass molds for producing lenses having concentric zones of different curvatures which comprises forming on one end of a circular rod a polished surface corresponding in size and curvature to the central zone of the lens to be formed, providing with a core a tube having an internal diameter substantially equal to the diameter of the rod, machining and polishing one end of the cored tube to provide a surface corresponding to the curvature of the zone concentric with the central zone of the lens to be formed and then removing said core and inserting in said tube said circular rod with their polished ends occupying the relative positions desired for the concentric zones of the lens to be formed.

RICHARD W. LUCE.